United States Patent [19]

Saito et al.

[11] 4,441,875
[45] Apr. 10, 1984

[54] MOLD APPARATUS FOR FORMING ARTICLE UNDER INFLUENCE OF MAGNETIC FIELD

[75] Inventors: Takahide Saito, Takatsuki; Yasuo Nakagawa, Nishinomiya, both of Japan

[73] Assignee: Sumitomo Bakelite Company Limited, Tokyo, Japan

[21] Appl. No.: 470,354

[22] Filed: Feb. 28, 1983

[30] Foreign Application Priority Data

Mar. 5, 1982 [JP]  Japan .................................. 57-34049

[51] Int. Cl.³ .......................................... B29C 1/022
[52] U.S. Cl. ...................................... 425/3; 249/134; 264/24; 264/108; 425/568
[58] Field of Search ................... 249/134; 425/3, 568; 264/24, 108

[56] References Cited

U.S. PATENT DOCUMENTS 3,881,853  5/1975  Loubier .............................. 425/3 X

*Primary Examiner*—Thomas P. Pavelko
*Attorney, Agent, or Firm*—Karl W. Flocks; Sheridan Neimark

[57] ABSTRACT

A mold apparatus for forming ring-shaped magnet from a plastic magnet material containing a magnetic powder under the influence of a magnetic field, comprising a stationary intermediate composite retainer plate and a movable intermediate composite retainer plate, the former being put on the latter, said movable intermediate composite retainer plate consisting of at least one cylindrical or inversed frusto-conical cavity block made of a magnetic material having a ring-shaped cavity, at least one cavity block holder made of non-magnetic material embracing and holding the cavity block and at least one cylindrical or inversed frusto-conical magnetism shielding member made of a non-magnetic material and disposed concentrically and in contact with the lower side of the cavity, said stationary intermediate composite retainer plate consisting of at least one cylindrical or inversed frusto-conical sprue block made of a magnetic material, and at least one sprue block holder made of a non-magnetic material embracing and holding the sprue block. The diameter of the side of said magnetism shielding member contacting the lower side of the cavity is greater than the outside diameter of the cavity. The sprue block is placed on the cavity concentrically with the cavity and the diameter of the side of the sprue block contacting the upper side of the cavity is not larger than the inside diameter of the cavity.

2 Claims, 4 Drawing Figures

MOLD APPARATUS FOR FORMING ARTICLE UNDER INFLUENCE OF MAGNETIC FIELD

BACKGROUND OF THE INVENTION

1. Field of the Invention

The present invention relates to a mold apparatus for forming an article under the influence of a magnetic field and, more particularly, to a mold apparatus suitable for use in a process for forming a synthetic resin magnet in which a mixture of a synthetic resin and a ferromagnetic powder is injection-molded in a magnetic field to form a ring-shaped synthetic resin magnet magnetized uniformly in the radial direction.

2. Description of the Prior Art

Ring-shaped magnets are often used in dynamic electric machines or devices such as D.C. motors, generators, hysteresis motors, step motors and so forth. Hitherto, a sintered magnet of barium ferrite or strontium ferrite has been used in said fields. Such known magnet materials, however, exhibit a thermal shrinkage of about 20% in volume when cooled after the sintering, resulting in an inferior dimensional precision and, in the worst case, cracking is caused in the product. The ring-shaped magnet produced from such materials requires a polishing of the surface of the sintered body to achieve the desired dimensional precision, and the polishing constitutes one of the factors raising the production cost of the magnet. It is also known to produce the ring-shaped magnet by a method other than sintering, e.g. by injection- or extrusion-molding a mixture of a ferromagnetic powder and a synthetic resin or a rubber. The use of a resin as the matrix material provides a magnet having a higher dimensional precision and facilitates the production of articles having complicated shapes as compared with the production of a magnet by sintering. However, the plastic magnet contains a synthetic resin, which is non-magnetic, as the matrix, and hence, exhibits an inferior magnetic force to that of the sintered magnet. Therefore, various attempts have been made to improve the magnetic force by imparting an anisotropy to the magnet.

SUMMARY OF THE INVENTION

Accordingly, an object of the invention is to provide a novel construction of a multi-cavity mold apparatus for producing ring-shaped magnets for use in motors or the like, said magnets having a higher performance than that presented by ordinary isotropic sintered ferrite magnet, by imparting a uniform radial anisotropy to the ring-shaped magnet.

A typical known method for imparting a radial anisotropy is to embed a magnetized coil in a mold. This known measure, however, cannot be applied suitably to a multi-cavity mold because the mold apparatus size is increased impractically and the molding machine is required to have a capacity considerably larger than the actually required injection capacity, resulting in an increase of the cost for making the mold apparatus and in a difficulty in determining the molding conditions. Therefore, the known method is not appropriate for mass-production.

The invention aims at obviating the above-described problem of the prior art.

Briefly, the present invention enables a radial anisotropy to be imparted which a high efficiency and a number of anisotropic products to be produced by fabricating ring-shaped resin magnet wherein the magnet is formed by magnetic material parts and non-magnetic parts around mold varities in the injection-molding of a mixture of a synthetic resin and a ferromagnetic powder having a magnetic anisotropy under influence of a magnetic field to form a ring-shaped plastic magnet in which the powder particles have been uniformly oriented in the radial direction and the magnetic force has thereby been enhanced to equivalent to or greater than that of isotropic sintered magnet.

According to the invention, there is provided a mold apparatus for forming ring-shaped magnets from a plastic magnet material containing a magnetic powder under the influence of a magnetic field, comprising a stationary intermediate composite retainer plate and a movable intermediate composite retainer plate, the former being put on the latter, said movable intermediate composite retainer plate consisting of at least one cylindrical or inversed frusto-conical cavity block having a ring-shaped cavity and made of a magnetic material, at least one cavity block holder made of non-magnetic material embracing and holding the cavity block, and a cylindrical or inversed frusto-conical magnetism shielding member made of a non-magnetic material and disposed concentrically and in contact with the lower side of the cavity, the diameter of the side of the magnetism shielding member contacting the lower side of the cavity being greater than the outside diameter of the cavity, said stationary intermediate composite retainer plate consisting of at least one cylindrical or inversed frusto-conical sprue block made of a magnetic material, at least one sprue block holder made of a non-magnetic material embracing and holding the sprue block, the sprue block being placed on the upper side of the cavity concentrically with the cavity, the diameter of the side of the sprue block contacting the upper side of the cavity being not larger than the inside diameter of the cavity.

The plastic magnet material usable in the present invention the blends is a mixture of ferromagnetic powder such as barium ferrite, strontium ferrite, rare earth metals or the like and a plastic material such as an olefinic resin, for example, polyethylene, polypropylene, EVA, Surlyn, a polyamide resin for example, nylon 6, nylon 6—6, nylon 12 and nylon 10, and an engineering plastic, for example, PPS, PS, PES, PEEK or the like.

DESCRIPTION OF THE PREFERRED EMBODIMENTS

Figure 1:
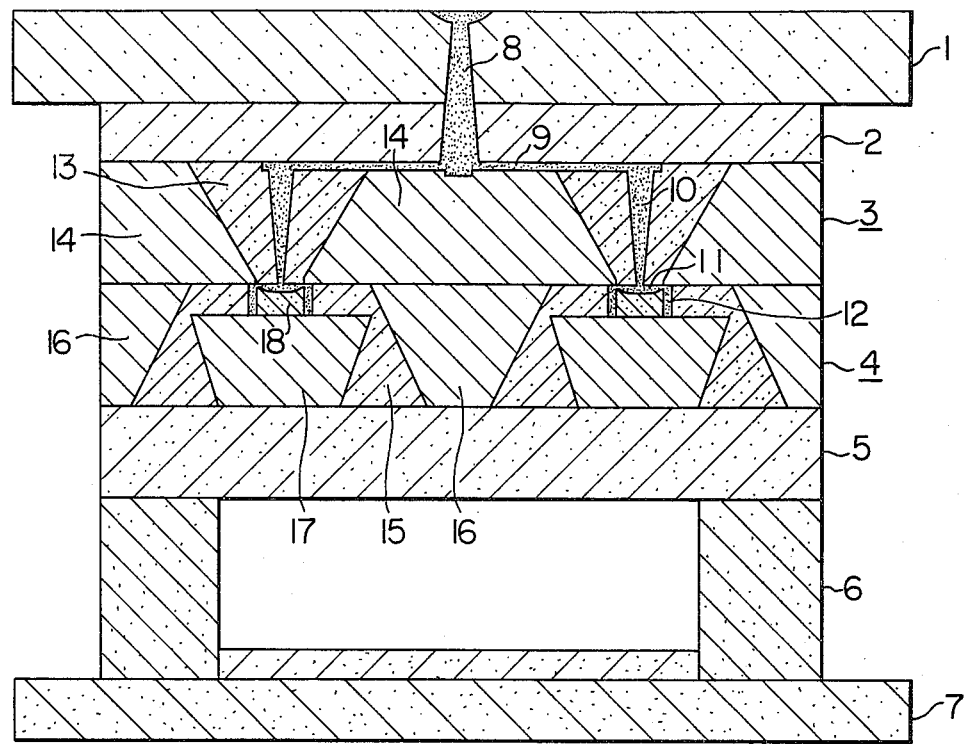
FIG. 1 is a sectional view of a mold apparatus embodying the present invention, capable of forming two pieces of magnet at a time.
Figure 2:
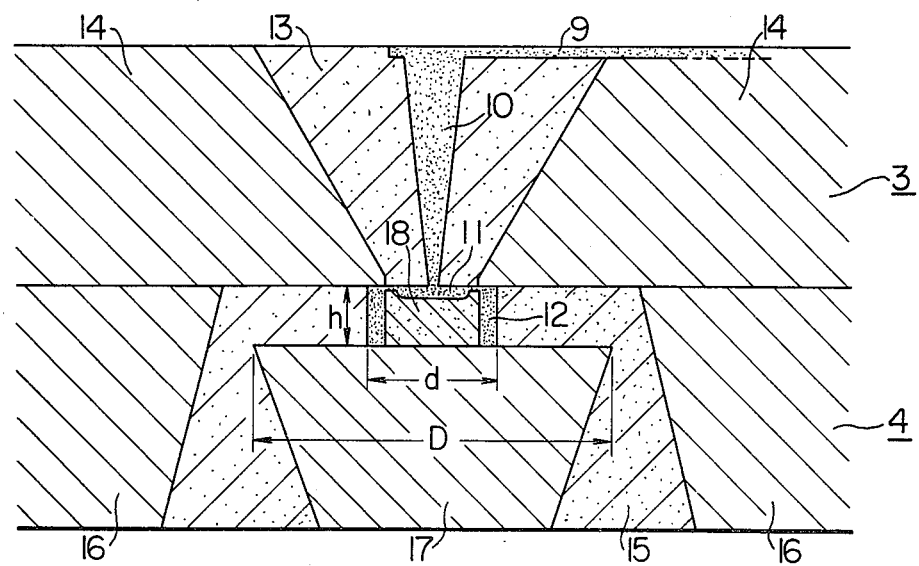
FIG. 2 is an enlarged view of a portion of the mold apparatus as shown in FIG. 1.

FIGS. 1 and 2 show a mold apparatus embodying the present invention. This mold apparatus is the so-called three-plate-type mold apparatus which is used ordinarily. However, when it is desired to produce only one piece of magnet at a time, the mold apparatus may be of a simple two-plate type with an ordinary sprue instead of the illustrated pin-point type sprue.

The mold apparatus of the illustrated embodiment has a stationary side and a movable side. The stationary side of the mold apparatus is constituted by a stationary top retainer plate 1 made of a magnetic material, a stationary intermediate retainer plate 2 made of a magnetic material and a stationary intermediate composite retainer plate 3 composed of a non-magnetic part and a magnetic part. On the other hand, the movable side of the mold apparatus is constituted by a movable intermediate composite retainer plate 4 composed of a non-magnetic part and a magnetic part, and movable retainer plates 5, 6 and 7 made of a magnetic material. The stationary top retainer plate 1 and the stationary intermediate retainer plate 2 are fixed to the stationary retainer plate of an injection molding machine having a nozzle port, while the stationary intermediate composite retainer plate 3 is supported at a middle height by means of four pillars interconnecting the stationary side and the movable side. The movable intermediate composite retainer plate 4 and the movable retainer plates 5, 6 and 7 are fixed to the movable plate of the injection molding machine. Thus, the mold as a whole has a three-plate type construction which is known per se. A sprue 8, runners 9 and sprues 10 are formed as illustrated. Molding cavities 12 are formed in the movable side. For instance, four cavities 12 are formed in the corners of the movable composite intermediate plate 4, into which the material in the molten state flows through runners 11 which contact the stationary side.

The mold apparatus of the present invention is characterized by the specific constructions of the stationary intermediate composite retainer plate 3 and the movable intermediate composite retainer plate 4.

More specifically, the stationary intermediate composite retainer plate 3 is composed of cylindrical or inversed frusto-conical sprue blocks 13 made of a magnetic material and a sprue block holder 14 made of a non-magnetic material and embracing and holding the sprue blocks 13. Each of the sprue blocks 13 has a lower surface contactable with the upper surface of corresponding ring-shaped cavity 12 formed in the movable intermediate composite retainer plate 4. The diameter of the lower side of the sprue block is equal to or smaller than the inside diameter of the ring-shaped cavity 12.

The movable intermediate composite retainer plate 4 is composed of cylindrical or frusto-conical cavity blocks 15 made of a magnetic material and having the above-mentioned ring-shaped cavities 12, a cavity block holder 16 made of a non-magnetic material and embracing and holding the cavity blocks 15, and cylindrical or inversed frusto-conical magnetism shield members 17 made of a non-magnetic material and contacting the lower side of the respective ring-shaped cavities 12. The upper side of the magnetism shield member 17 has a diameter greater than the outside diameter of the ring-shaped cavity 12. Needless to say, the sprue block 13, the ring-shaped cavity 12 and the magnetism shield member 17 constituting a unit are arranged concentrically with one another.

A description will be made below as to how to use the mold apparatus of the described embodiment, as well as the advantage brought about from this mold apparatus.

In the closed state of the mold apparatus as shown in FIG. 1, a coil (not shown) is energized to apply a magnetic field to the mold apparatus. The magnetic force lines pass through the stationary top retainer plate 1 and the stationary intermediate retainer plate 2, and are concentrated to ring cores 18 of magnetic material by the effect of the sprue blocks 13 made of magnetic material. The magnetic force lines usually run straight through the magnetic material but, in this case, the magnetism shield members 17 prevent the magnetic force lines from running straight. The magnetic force lines, thereby, run to the radial directions of the cavity blocks 15 made of magnetic material through which the magnetic force lines are most liable to run. Therefore, the plastic magnet injected under the influence of this magnetic field is orientated in the radial direction. The magnetic force lines running in the radial direction are deflected once more to penetrate the movable retainer plates 5, 6 and 7.

The plastic magnet material is injected by the injection machine into the mold apparatus which is under the influence of the magnetic field as explained before. In this case, the particles of the magnetic powder in the plastic magnet material are orientated in the direction of the magnetic force lines in the ring-shaped cavity 12. In this case, the application of the magnetic field may be effected after the injection of the plastic magnet material.

Subsequently, the magnetic field is removed and the mold is opened, after which the cooled and solidified ring-shaped plastic magnet was taken out, whereby a ring-shaped product in which magnetic powder particles are oriented uniformly in the diameter direction is obtained. With or without an additional step of demagnetization, the ring-shaped magnet is multi-pole-magnetized by post-magnetization to develop magnetic poles, for example, 2, 4, 6, 8, 12, 16, . . . , 60, . . . , 70 . . . poles.

Thus, the essential feature of the mold apparatus of this invention resides in that the unidirectional magnetic force lines are used, cylindrical or inversed frusto-conical sprue blocks 13 are used and the diameter of the lower side of the sprue block 13 is set equal to or smaller than the inside diameter of the ring-shaped cavity 12 contacting therewith, whereby the magnetic force lines are concentrated to the core 18 of the ring. In addition, by the use of the cylindrical or inversed frusto-conical magnetism shield member 17 having an upper side of a diameter greater than the outside diameter of the ring-shaped cavity 12 contacting therewith, it is possible to interrupt the magnetic force lines and deflect the same vertically, so that the magnetic force lines can efficiently pass through the ring-shaped cavities 12 at a right angle to the axis of the latter. In order to concentrate the magnetic force lines most efficiently and orient uniformly the shaped article, plastic magnet, in the radial direction, the sprue block 13, the cavity block 15 and the magnetism shield member 17 have preferably frusto-conical or inversed frusto-conical forms of apex angles preferably ranging between 45° and 65°. More specifically, the diameter D of the upper side of the cavity block 15 is determined in relation to the outside diameter d of the ring-shaped cavity 12 and the height h of the same, preferably to meet the following condition:

$$1/5 \leq (D-d)/h \leq 10.$$

If this ratio is smaller than the lower limit of this range, the degree of orientation in the radial direction is decreased unfavourably. To the contrary, if this ratio exceeds the upper limit of this range, the mold apparatus becomes too large when the mold apparatus is intended for multi-cavity mold. Another important factor relates to the arrangement of the gate. That is, according to the present invention, the runner 11 is formed in, for example, a cross form or a circular form, and four independent gates or a common circular gate is formed in communication with the runner 11 in the radial direction of the ring to assure a uniform orientation. The size and thickness of the gate are not critical and may suitably selected to ensure a smooth flow of the plastic magnet material.

EXAMPLE 1

Using the mold apparatus of the present invention shown in FIG. 1, ring-shaped magnets having an outside radius r of 22 mm and an inside radius of 16 mm were produced from a material consisting of a polyamide 6 filled with 87% by weight of strontium ferrite powder, while varying the factors h and D shown in FIG. 2. The degrees of orientation in the radial direction of the ring-shaped magnets were measured by means of X-ray, the result of which is shown in Table 1.

TABLE 1

| D (mm) | (%) h (mm) | | | | |
|---|---|---|---|---|---|
|  | 2 | 5 | 10 | 15 | 20 |
| 24 | 57 | 50 | 46 | 34 | 35 |
| 26 | 62 | 58 | 53 | 49 | 45 |
| 32 | 70 | 64 | 57 | 54 | 50 |
| 42 | 77 | 71 | 61 | 59 | 55 |
| 52 | 79 | 75 | 66 | 62 | 61 |
| 62 | 78 | 76 | 69 | 65 | 63 |
| 72 | 78 | 79 | 70 | 69 | 67 |

From Table 1, it will be understood that the degree of orientation is increased as the value of $(D-d)/h$ is increased. This tendency, however, reaches substantially a saturation when the ratio $(D-d)/h$ exceeds 10, and the increase of the degree of orientation is not appreciable when the ratio $(D-d)/h$ is smaller than 1/5.

EXAMPLE 2

Figure 3:
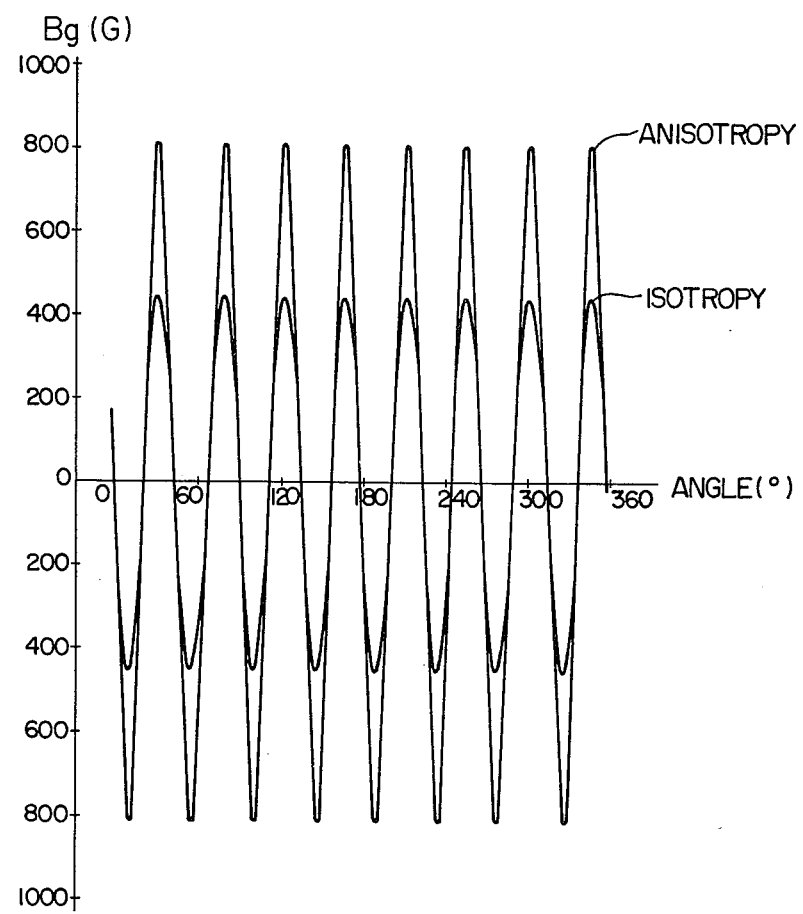
FIGS. 3 and 4 are illustrations of the magnetic flux values on the 16-pole magnetized surfaces of a plastic magnet having a radial anisotropy produced by means of the mold apparatus of the present invention and of a conventional isotropic magnet.
Figure 4:
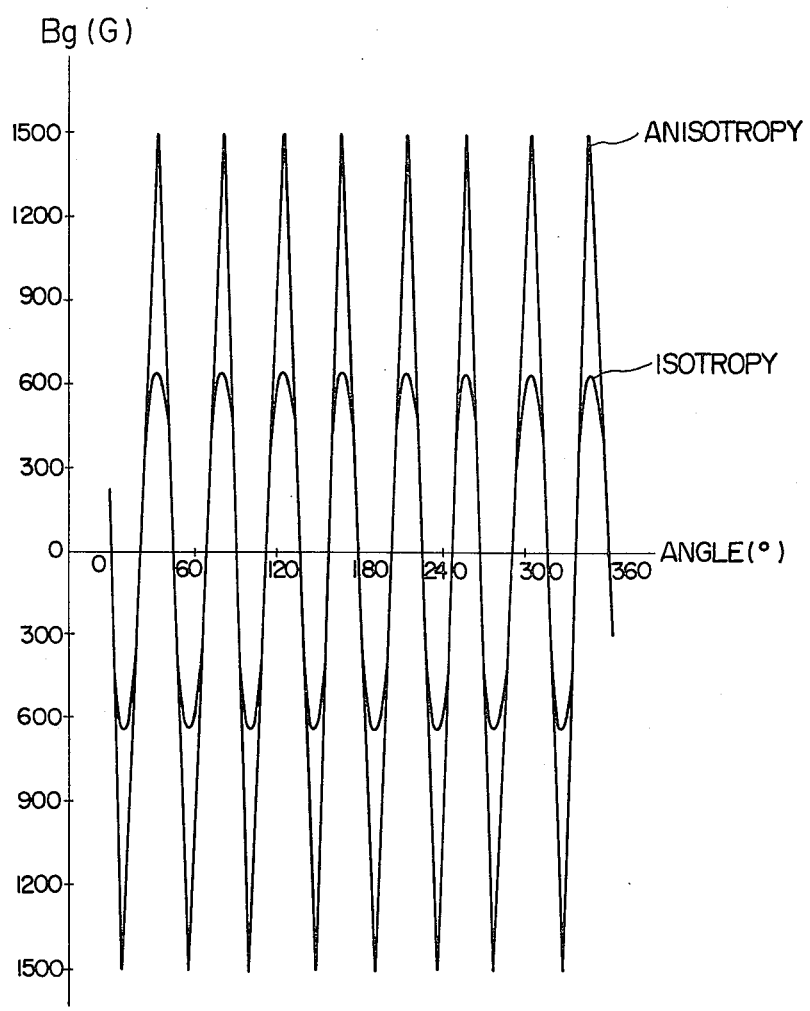

Ring-shaped magnets with radial anisotropy, having an outside radius of 22 mm, an inside radius of 16 mm and an axial height of 10 mm were formed by injection molding under the condition of $(D-d)/h=6$ from a material consisting of a polyamide 6 filled with 87% by weight of powdered strontium ferrite. Also, ring-shaped magnets with isotropy was formed under the same conditions. These magnets were 16-pole magnetized, and magnetic flux densities on the surfaces of these magnets were measured. The results obtained are shown in FIG. 3. As will be seen from this Figure, the ring-shaped magnets with radial anisotropy showed a maximum magnetic flux density of 800 Gauss, while the isotropic ring-shaped magnets showed a maximum magnetic flux density as small as 470 Gauss. This apparently proves the radial orientation of magnetic particles in the magnet. Test pieces were cut out of the ring-shaped magnets with radial anisotropy, and magnetic force was measured with such test pieces, to obtain the result shown in Table 2. Table 2 clearly shows the effect of the mold in accordance with the present invention.

TABLE 2

| Residual magnetic flux density (Gauss) | Coercive force (Oelsted) | Max. energy product ($\times 10^6$ G · Oe) | Degree of orientation (%) |
|---|---|---|---|
| 2530 | 2370 | 1.75 | 78 |

EXAMPLE 3

Ring-shaped magnets with radial anisotropy, having an outside radius of 22 mm, an inside radius of 16 mm and an axial height of 10 mm were formed by injection molding under the condition of $(D-d)/h=6$ from material consisting of a polyamide 12 filled with 93% by weight of powder of $SmCo_5$ or $Sm_2Co_{17}$ which are rare earth metals. Also, ring-shaped magnets with isotropy was formed under the same conditions. These magnets were 16-pole magnetized, and magnetic flux densities on the surfaces of these magnets were measured. The results obtained are shown in FIG. 3. As will be seen from this Figure, the ring-shaped magnets with radial anisotropy showed a maximum magnetic flux density of 1,500 Gauss, while the isotropic ring-shaped magnets showed a maximum magnetic flux density as small as 650 Gauss. This apparently proves the radial orientation of the magnetic particles in the magnet. Test pieces were cut out of the ring-shaped magnets with radial anisotropy, and magnetic force was measured with such test pieces, to obtain the result shown in Table 3. Table 3 clearly shows the effect of the mold in accordance with the invention.

TABLE 3

| | Residual magnetic flux density (Gauss) | Coercive force (Oelsted) | Max. energy product ($\times 10^6$ G · Oe) | Degree of orientation (%) |
|---|---|---|---|---|
| $SmCo_5$ system | 5800 | 4200 | 8.2 | 99 |
| $Sm_2Co_{17}$ system | 7300 | 3700 | 8.7 | 99 |

What is claimed is:

1. A mold apparatus for forming ring-shaped magnets from a plastic magnet material containing a magnetic powder under the influence of a magnetic field, comprising a stationary intermediate composite retainer plate and a movable intermediate composite retainer plate, the former being put on the latter; said movable intermediate composite retainer plate consisting of at least one cylindrical or inversed frusto-conical cavity block made of a magnetic material having a ring-shaped cavity, at least one cavity block holder made of a non-magnetic material embracing and holding said cavity block and at least one cylindrical or inversed frusto-conical magnetism shielding member made of a non-magnetic material and disposed concentrically and in contact with the lower side of said cavity, the diameter of the side of said magnetism shielding member contacting the lower side of said cavity being greater than the outside diameter of said cavity; said stationary intermediate composite retainer plate consisting of at least one cylindrical or inversed frusto-conical sprue block made of a magnetic material, at least one sprue block holder made of a non-magnetic material embracing and holding said sprue block, said sprue block being placed on said cavity concentrically with the cavity, the diameter of the side of said sprue block contacting the upper side of said cavity being not larger than the inside diameter of said cavity.

2. A mold apparatus according to claim 1, wherein the diameter (D) of the upper side of said cavity block, the outside diameter (d) of said ring-shaped cavity and the height (h) of said ring-shaped cavity have the following interrelation:

$$1/5 \leq (D-d)/h \leq 10.$$

* * * * *